United States Patent [19]

Dent

[11] Patent Number: 5,148,485
[45] Date of Patent: Sep. 15, 1992

[54] ENCRYPTON SYSTEM FOR DIGITAL CELLULAR COMMUNICATIONS

[75] Inventor: Paul Dent, Stehag, Sweden

[73] Assignee: Ericsson GE Mobile Communications Holding, Inc., Paramus, N.J.

[21] Appl. No.: 708,876

[22] Filed: May 31, 1991

Related U.S. Application Data

[63] Continuation of Ser. No. 556,358, Jul. 20, 1990, abandoned.

[51] Int. Cl.⁵ .............................................. H04L 9/02
[52] U.S. Cl. ...................................... 380/46; 380/28; 380/49; 380/50
[58] Field of Search ....................... 380/23, 28, 43, 44, 380/46, 47, 48, 49, 50; 379/59, 60, 61, 62, 63; 375/107, 110, 112; 370/103, 105, 107; 455/33

[56] References Cited

U.S. PATENT DOCUMENTS

| | | | |
|---|---|---|---|
| 4,316,055 | 2/1982 | Feistel | 380/28 X |
| 4,811,377 | 3/1989 | Krolopp et al. | 379/62 |
| 4,860,353 | 8/1989 | Brown | 380/44 |
| 4,876,740 | 10/1989 | Levine et al. | 379/59 X |
| 5,008,935 | 4/1991 | Roberts | 380/28 X |

Primary Examiner—Tod Swann
Attorney, Agent, or Firm—Johnson & Gibbs

[57] ABSTRACT

A system for generating a pseudo-random bit sequence which may be used in enciphering digital data prior to transmission or storage of the data. The bit sequence is generated by expanding a plurality of secret key bits in a manner suitable for implementation with a conventional microprocessor arithmetic logic unit (ALU). The system of the present invention may be used, for example, to secure voice or data communications between a base station and a mobile station in a digital cellular communications system.

69 Claims, 5 Drawing Sheets

ENCRYPTON SYSTEM FOR DIGITAL CELLULAR COMMUNICATIONS

This is a continuation of application Ser. No. 07/556,358 filed Jul. 20, 1990 now abandoned.

CROSS REFERENCE TO RELATED APPLICATIONS

This application contains subject matter related to copending U.S. patent application is a continuation of U.S. patent application Ser. No. 556,358, now abandoned, and Ser. No. 556,102, entitled "Continuous Cipher Synchronization for Cellular Communication System", and also to co-pending U.S. patent application Ser. No. 556,103, entitled "Resynchronization of Encryption Systems upon Handoff", both of which were filed on Jul. 20, 1990, and to co-pending U.S. patent application Ser. No. 556,890, filed Jul. 23, 1990 now U.S. Pat. No. 5,091,942 entitled "Authentication System For Digital Cellular Communications". Such applications and the disclosures therein are hereby incorporated by reference herein.

BACKGROUND OF THE INVENTION

1. Field of the Invention

The present invention relates to digital cellular communication systems, and more particularly, to a method and apparatus for the encryption of data communications within such a system.

2. History of the Prior Art

Cellular radio communications is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length. Similarly, wires connect the telephone outlet with a local switching office of the telephone company. A telephone user's movement is thus restricted not only by the length of the telephone cord, but also by the availability of an operative telephone outlet, i.e. an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others. In a typical cellular radio system, the user, or the user's vehicle, carries a relatively small, wireless device which communicates with a base station and connects the user to other mobile stations in the system and to landline parties in the public switched telephone network (PSTN).

A significant disadvantage of existing cellular radio communication systems is the ease with which analog radio transmissions may be intercepted. In particular, some or all of the communications between the mobile station and the base station may be monitored, without authorization, simply by tuning an appropriate electronic receiver to the frequency or frequencies of the communications. Hence, anyone with access to such a receiver and an interest in eavesdropping can violate the privacy of the communications virtually at will and with total impunity. While there have been efforts to make electronic eavesdropping illegal, the clandestine nature of such activities generally means that most, if not all, instances of eavesdropping will go undetected and, therefore, unpunished and undeterred. The possibility that a competitor or a foe may decide to "tune in" to one's seemingly private telephone conversations has heretofore hindered the proliferation of cellular radio communication systems and, left unchecked, will continue to threaten the viability of such systems for businesses and government applications.

It has recently become clear that the cellular radio telecommunications systems of the future will be implemented using digital rather than analog technology. The switch to digital is dictated, primarily, by considerations relating to system speed and capacity. A single analog, or voice, radio frequency (RF) channel can accommodate four (4) to six (6) digital, or data, RF channels. Thus, by digitizing speech prior to transmission over the voice channel, the channel capacity and, consequently the overall system capacity, may be increased dramatically without increasing the bandwidth of the voice channel. As a corollary, the system is able to handle a substantially greater number of mobile stations at a significantly lower cost.

Although the switch from analog to digital cellular radio systems ameliorates somewhat the likelihood of breeches in the security of communications between the base station and the mobile station, the risk of electronic eavesdropping is far from eliminated. A digital receiver may be constructed which is capable of decoding the digital signals and generating the original speech. The hardware may be more complicated and the undertaking more expensive than in the case of analog transmission, but the possibility persists that highly personal or sensitive conversations in a digital cellular radio system may be monitored by a third party and potentially used to the detriment of the system users. Moreover, the very possibility of third parties eavesdropping of a telephone conversation eliminates cellular telecommunications as a medium for certain government communications. Certain business users may be equally sensitive to even the possibility of a security breech. Thus, to render cellular systems as viable alternatives to the conventional wireline networks, security of communications must be available on at least some circuits.

Various solutions have been proposed to alleviate the security concerns engendered by radio transmission of confidential data. A known solution, implemented by some existing communication systems, uses cryptoalgorithms to encrypt (scramble) digital data into an unintelligible form prior to transmission. For example, the article entitled "Cloak and Data" by Rick Grehan in *BYTE* Magazine, dated June 1990 at pages 311-324, for a general discussion of cryptographic systems. In most systems currently available, speech is digitized and processed through an encryption device to produce a communications signal that appears to be random or pseudorandom in nature until it is decrypted at an authorized receiver. The particular algorithm used by the encryption device may be a proprietary algorithm or an algorithm found in the public domain. Further background for such techniques may be found in the article entitled "The Mathematics of Public-Key Cryptography" by Martin E. Hellman in *Scientific American* dated August 1979 at 146–167.

In 1977, the U.S. National Bureau of Standards published a cryptoalgorithm defined as the Data Encryption Standard (DES). See Federal Information Processing Standards Publication 46 (FIPS PUB 46) of the National Technical Information Service (1977). The DES method of encryption utilizes a publicly known mathematical algorithm, which produces a stream of random numbers, and a data encryption key consisting of a 64 bit binary word. Digital data, typically in ASCII format, is transformed into an apparently random sequence of bits. The encrypted data can be decrypted pursuant to the standard DES decryption procedure only if the encryption key, which may be any 64 bit binary word, is also known to the receiver of the encrypted data. Because the DES encryption and decryption procedures are publicly known, the security of the key is crucial to the effective use of DES.

Commercial devices implementing the DES encryption/decryption procedure are generally in the form of integrated circuits which accept as a first input the data to be encrypted and as a second input the 64 bit key. Most such devices operate in a cipher feedback (CFB) mode in which the encrypted data is provided as a third input to the DES device so as to prevent the transmission of repetitive sequences of encrypted data when the data being encrypted contains repetitive sequences of identical characters. The chief advantage of CFB encryption of data is self synchronization of the encrypted signal. However, a major disadvantage of CFB devices operating over an RF link is the reduced operational range of the mobile stations caused by error multiplication related to receiver sensitivity. That is, a single error in Transmission of an encrypted data block produces, on average, half of the bits in the deciphered data to be in error producing a hugh magnification of the transmission error rate. Thus, a mobile station would have to remain within a certain limited range of a base station in order to maintain a sufficiently high signal-to-noise ratio to attempt to avoid erroneous reception of transmitted data bits. Error multiplication occurs in CFB mode because erroneously received bits are continuously fed back to the decryption device until the error propagates out and the receiver eventually resynchronizes.

Another known technique for the encryption of data, which does not suffer from the error multiplication problem encountered in the CFB mode of operation, is counter addressing (CA). In the CA mode of operation, a keystream generator is used to produce a pseudo-random keystream of bits by processing an encryption key containing a plurality of key data bits. The keystream is then used by the encryption device to encrypt the data signal. Typically, the keystream is added (modulo-2) with the data signal on a bit-by-bit basis by an exclusive OR (XOR) logic gate to produce a scrambled binary data signal. The scrambled signal may be descrambled by adding (modulo 2) to the scrambled signal an identical keystream generated synchronously by an identical keystream generator that is initialized with the same binary encryption key. In this fashion, the encryption device may be "addressed" by the pseudo-random counter. Thus, in CA mode, continuous bit synchronization between the scrambler to the descrambler is required in order to allow proper operation of the descrambler key generator without necessitating periodic key generator data transfers. Unfortunately, bit synchronization over an RF channel in a cellular radio system is very difficult to maintain due, in large part, to the phenomena of Rayleigh fading which is caused by the movement of the mobile station through the multipath interference patterns generated by reflection from obstacles near the receiving equipment. A single error bit in transmission through the decryption circuit out of phase with the encryption circuit and the output produced at the receiver is meaningless. The CA technique is generally unsuitable for radio link encryption which must be more robust against bit transmission errors.

The difficulties attending continuous bit synchronization have led to the use of "time-of-day" or "frame number" driven keystream generators. Such keystream generators may be synchronized to a time of day counter, i.e. hour, minute and second, or to a simple number counter and the encryption and decryption circuits can be sending the current count in the event one falls out of synchronization with another.

To increase the security of communications in systems utilizing time-of-day or frame number driven keystream generators, the value of each bit in the pseudo-random keystream is preferably made a function of the values of all the key bits in the encryption key. In this manner, a person desiring to descramble the encrypted signal must "crack" or "break" all of the bits of the encryption key which may be in the order of a hundred (100) bits or more. A keystream of this type is generally produced by mathematically expanding the encryption key word in accordance with a selected algorithm which incorporates the count of the time-of-day counter. However, if every bit of the encryption key is to influence every bit in the keystream and if the keystream is to be added to the data stream bits on a one-to-one basis, the required number of key word expansion computations per second is enormous and can readily exceed the real time computational capability of the system. While the degree of necessary computations suggests the use of a supercomputer, the cost of supercomputers for this purpose is prohibitive. Therefore, a method and apparatus are needed to achieve the expansion of the keystream with conventional microprocessors and at conventional microprocessor speeds.

SUMMARY OF THE INVENTION

In one aspect, the invention includes a method of generating a pseudo-random bit sequence for use in enciphering digital data in which said bit sequence is a function of a plurality of selected key bits. The method includes generating a plurality of multi-bit values each of which are a function of at least some of said selected key bits and storing each of said plurality of multi-bit values in a discrete in a location in a memory. A sequence of values is generated in a register by incrementing the present value contained in the register in response to each cycle of operation. A sequence of multi-bit values is cyclically calculated in accordance with a first preselected algorithm each of which values is a function of at least one of the multi-bit values stored in said memory and the value contained in said register. The contents of said register is cyclically reset with a value obtained as a result of each calculation and a multi-bit keyword is cyclically extracted which is a function of a value obtained as a result of each calculation. The multi-bit keywords are sequentially combined into said pseudo-random bit sequence. In one embodiment the plurality of multi-bit values generated are each a function of all of the selected key bits.

In another aspect, the present invention includes a cellular communication system having an encryption subsystem which includes a key stream generator which uses a secret key to generate a pseudo-random key stream in two stages. First, the secret key is expanded in accordance with an algorithm to produce a look up table which is stored in memory. Second, the circuit uses the count of a register along with the key in combination with the data stored in the look up table to generate a pseudo-random key stream which is mixed with the data before transmission. The system of the present invention employs a time of day driven counter along with the data stored in the look-up table and the secret key and uses them both to generate the key stream. Such counters in both the transmitter and receiver may be periodically resynchronized in the event that desynchronization occurs.

In a still further aspect, the present invention includes a digital cellular communication system in which the streams of digital data being transmitted and received by the base station and the mobile units are cryptographically encoded to provide security of telecommunications. The system incorporates means for adding a pseudo-random keystream of binary bits to the information carrying digital signal of each transmitter and receiver in the system to create streams of digital data to be transmitted and received within the system. A means for generating the pseudo-random keystream of binary bits as a function of a plurality of selected secret key bit includes means for generating a plurality of multi-bit values each of which are a function of at least some of the selected key bits along with means for storing each of said plurality of multi-bit values in a discrete location in a memory. A means for generating a sequence of values in a register increments the present value contained in the register in response to each cycle of operation. The system also includes a means for cyclically calculating a sequence of multi-bit values in accordance with a first preselected algorithm each of which values is a function of at least one of the multi-bit values stored in the memory and the value contained in the register and a means for cyclically resetting the contents of the register with a value obtained as a result of each calculation. A multi-bit keyword which is a function of a value obtained as a result of each calculation is cyclically extracted and combined into the pseudo-random keystream of binary bits used to cryptographically encode and decode the streams of digital data to be transmitted and received.

BRIEF DESCRIPTION OF THE DRAWINGS

The present invention will be better understood and its numerous objects and advantages will become apparent to those skilled in the art by reference to the following drawings in which.

DETAILED DESCRIPTION OF THE PREFERRED EMBODIMENT

Figure 1:
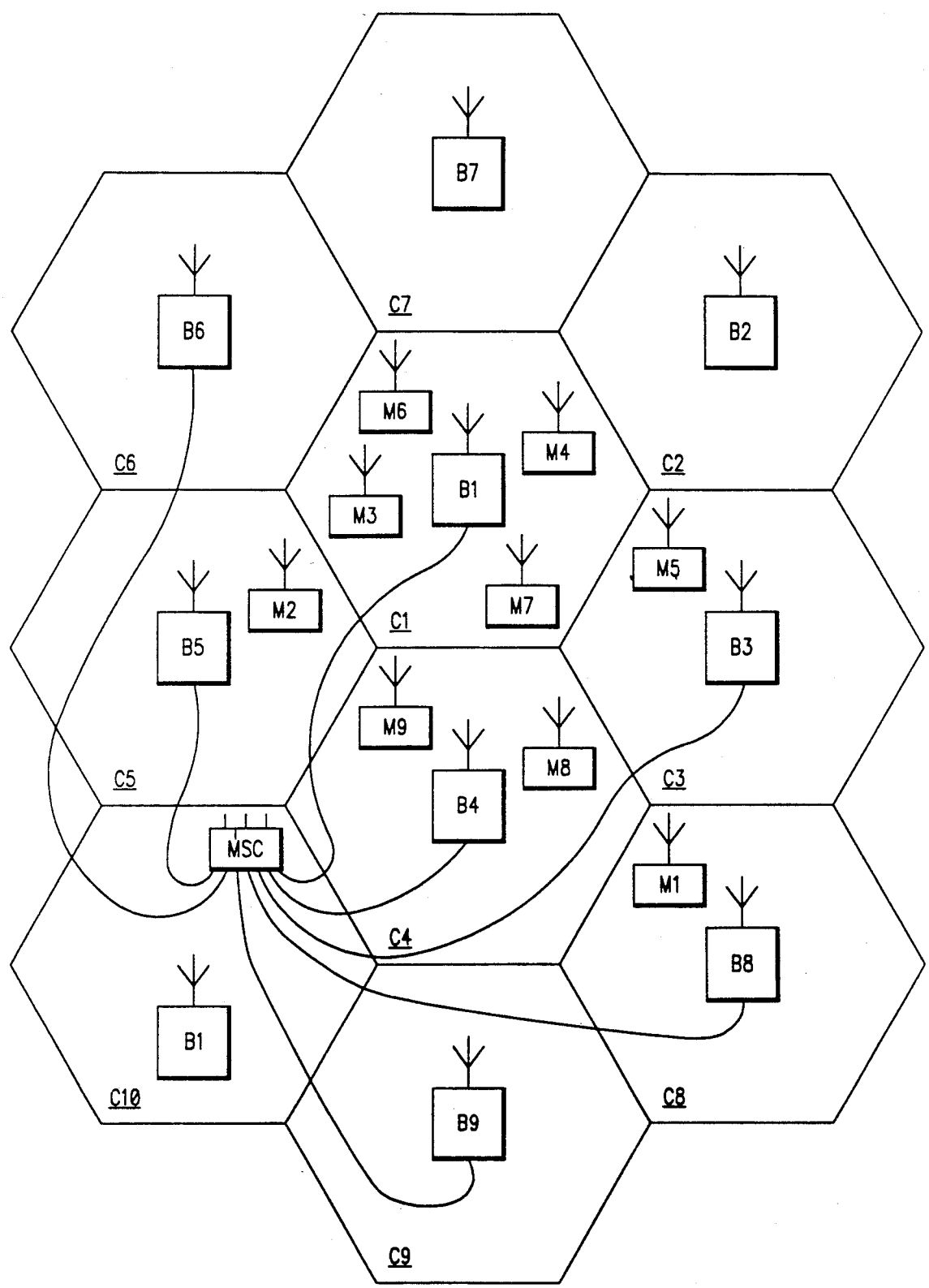
FIG. 1 is a pictorial representation of a cellular radio communications system including a mobile switching center, a plurality of base stations and a plurality of mobile stations.

Referring first to FIG. 1, there is illustrated therein a conventional cellular radio communications system of a type to which the present invention generally pertains. In FIG. 1, an arbitrary geographic area may be seen divided into a plurality of contiguous radio coverage areas, or cells, C1-C10. While the system of FIG. 1 is shown to include only 10 cells, it should be clearly understood that, in practice, the number of cells may be much larger.

Associated with and located within each of the cells C1-C10 is a base station designated as a corresponding one of a plurality of base stations B1-B10. Each of the base stations B1-B10 includes a transmitter, a receiver and controller as is well known in the art. In FIG. 1, the base stations B1-B10 are located at the center of the cells C1-C10, respectively, and are equipped with omni-directional antennas. However, in other configurations of the cellular radio system, the base stations B1-B10 may be located near the periphery, or otherwise away from the centers of the cells C1-C10 and may illuminate the cells C1-C10 with radio signals either omni-directionally or directionally. Therefore, the representation of the cellular radio system of FIG. 1 is for purposes of illustration only and is not intended as a limitation on the possible implementations of the cellular radio system.

With continuing reference to FIG. 1, a plurality of mobile stations M1-M10 may be found within the cells C1-C10. Again, only ten mobile stations are shown in FIG. 1 but it should be understood that the actual number of mobile stations may be much larger in practice and will invariably exceed the number of base stations. Moreover, while none of the mobile stations M1-M10 may be found in some of the cells C1-C10, the presence or absence of the mobile stations M1-M10 in any particular one of the cells C1-C10 should be understood to depend, in practice, on the individual desires of each of the mobile stations M1-M10 who may roam from one location in a cell to another or from one cell to an adjacent or neighboring cell.

Each of the mobile stations M1-M10 is capable of initiating or receiving a telephone call through one or more of the base stations B1-B10 and a mobile switching center MSC. The mobile switching center MSC is connected by communications links, e.g. cables, to each of the illustrative base stations B1-B10 and to the fixed public switching telephone network (PSTN), not shown, or a similar fixed network which may include an integrated system digital network (ISDN) facility. The relevant connections between the mobile switching center MSC and the base stations B1-B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1–C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions and "handoff" instructions as a mobile station travels out of the radio coverage of one cell and into the radio coverage of another cell. The control or voice channels may operate either in an analog or a digital mode or a combination thereof. In the digital mode, analog messages, such as voice or control signals, are converted to digital signal representations prior to transmission over the RF channel. Purely data messages, such as those generated by computers or by digitized voice devices, may be formatted and transmitted directly over a digital channel.

In a cellular radio system using time division multiplexing (TDM), a plurality of digital channels may share a common RF channel. The RF channel is divided into a series of "time slots", each containing a burst of information from a different data source and separated by guard time from one another, and the time slots are grouped into "frames" as is well known in the art. The number of time slots per frame varies depending on the bandwidth of the digital channels sought to be accommodated by the RF channel. The frame may, for example, consist of three (3) time slots, each of which is allocated to a digital channel. Thus, the RF channel will accommodate three digital channels. In one embodiment of the present invention discussed herein, a frame is designated to comprise three time slots. However, the teachings of the present invention should be clearly understood to be equally applicable to a cellular radio system utilizing any number of time slots per frame.

Figure 2:
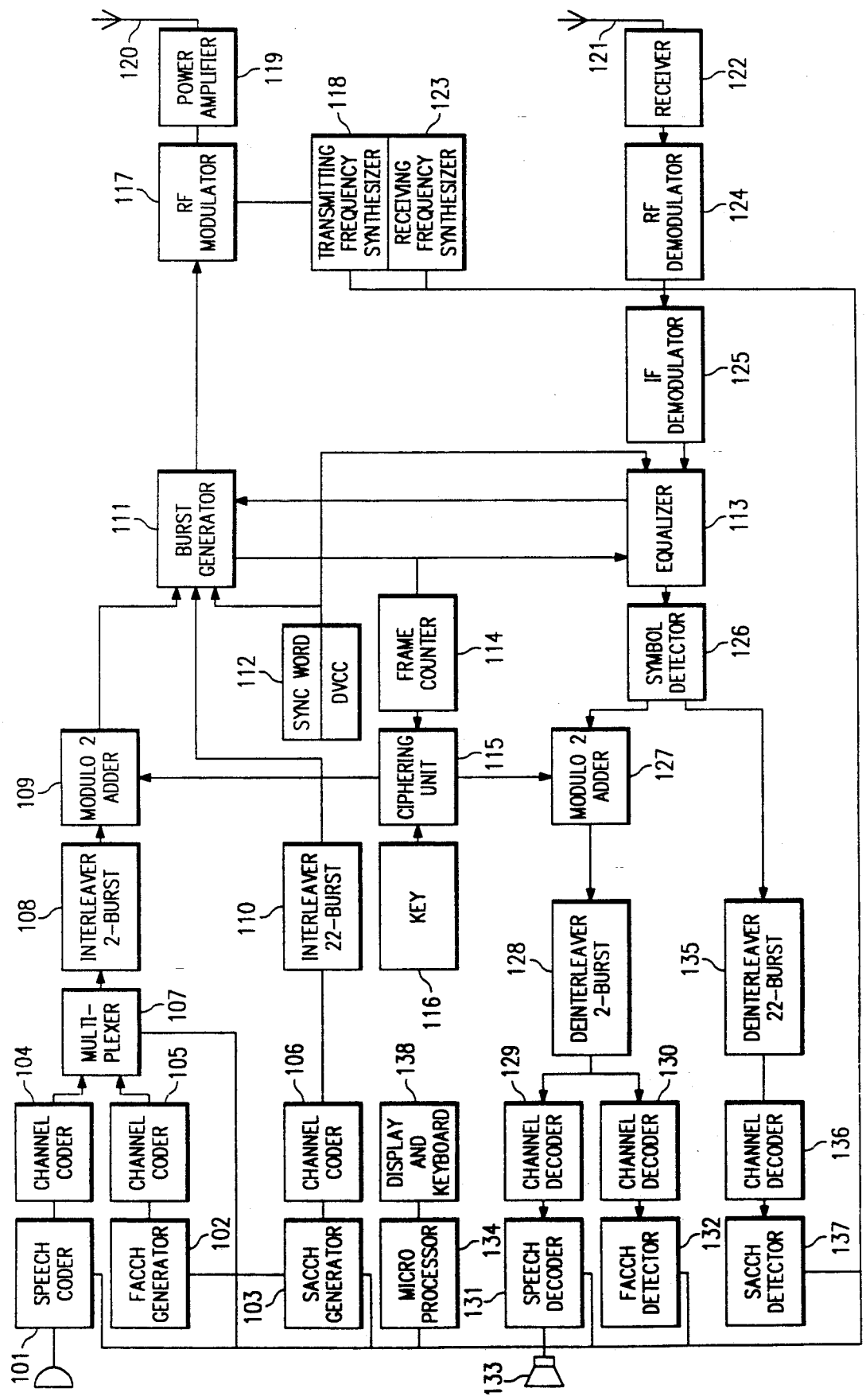
FIG. 2 is a schematic block diagram of mobile station equipment used in accordance with one embodiment of the system of the present invention.

Referring next to FIG. 2, there is shown therein a schematic block diagram of the mobile station equipment which are used in accordance with one embodiment of the present invention. The equipment illustrated in FIG. 2 may be used for communication over digital channels. A voice signal detected by a microphone 100 and destined for transmission by the mobile station is provided as input to a speech coder 101 which converts the analog voice signal into a digital data bit stream. The data bit stream is then divided into data packets or messages in accordance with the time division multiple access (TDMA) technique of digital communications. A fast associated control channel (FACCH) generator 102 exchanges control or supervisory messages with a base station in the cellular radio system. The conventional FACCH generator operates in a "blank and burst" fashion whereby a user frame of data is muted and the control message generated by the FACCH generator 102 is transmitted instead at a fast rate.

In contrast to the blank and burst operation of the FACCH generator 102, a slow associated control channel (SACCH) generator 103 continuously exchanges control messages with the base station. The output of the SACCH generator is assigned a fixed length byte, e.g. 12 bits, and included as a part of each time slot in the message train (frames). Channel coders 104, 105, 106 are connected to the speech coder 101, FACCH generator 102 and SACCH generator 103, respectively. Each of the channel coders 104, 105, 106 performs error detection and recovery by manipulating incoming data using the techniques of convolutional encoding, which protects important data bits in the speech code, and cyclic redundancy check (CRC), wherein the most significant bits in the speech coder frame, e.g., 12 bits, are used for computing a 7 bit error check.

Referring again to FIG. 2, the channel coders 104, 105 are connected to a multiplexer 107 which is used for time division multiplexing of the digitized voice messages with the FACCH supervisory messages. The output of the multiplexer 107 is coupled to a 2-burst interleaver 108 which divides each data message to be transmitted by the mobile station (for example, a message containing 260 bits) into two equal but separate parts (each part containing 130 bits) arranged in two consecutive time slots. In this manner, the deteriorative effects of Rayleigh fading may be significantly reduced. The output of the 2-burst interleaver 108 is provided as input to a modulo-2 adder 109 where the data to be transmitted is ciphered on a bit-by-bit basis by logical modulo-2 addition with a pseudo-random keystream which is generated in accordance with the system of the present invention described below.

The output of the channel coder 106 is provided as input to a 22-burst interleaver 110. The 22-burst interleaver 110 divides the SACCH data into 22 consecutive time slots, each occupied by a byte consisting of 12 bits of control information. The interleaved SACCH data forms one of the inputs to a burst generator 111. Another input to the burst generator 111 is provided by the output of the modulo-2 adder 109. The burst generator 111 produces "message bursts" of data, each consisting of a time slot identifier (TI), a digital verification color code (DVCC), control or supervisory information and the data to be transmitted, as further explained below.

Transmitted in each of the time slots in a frame is a time slot identifier (TI), which is used for time slot identification and receiver synchronization, and a digital verification color code (DVCC), which ensures that the proper RF channel is being decoded. In the exemplary frame of the present invention, a set of three different 28-bit TIs is defined, one for each time slot while an identical 8-bit DVCC is transmitted in each of the three time slots. The TI and DVCC are provided in the mobile station by a sync word/DVCC generator 112 connected to the burst generator 111 as shown in FIG. 2. The burst generator 111 combines the outputs of the modulo-2 adder 109, the 22-burst interleaver 110 and the sync word/DVCC generator 112 to produce a series of message bursts, each comprised of data (260 bits), SACCH information (12 bits), TI (28 bits), coded DVCC (12 bits) and 12 delimiter bits for a total of 324 bits which are integrated according to the time slot format specified by the EIA/TIA IS-54 standard.

Each of the message bursts is transmitted in one of the three time slots included in a frame as discussed hereinabove. The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be used for checking the values of the TI and the DVCC. The burst generator 111 is also connected to a 20 ms frame counter 114 which is used to update a ciphering code that is applied by the mobile station every 20 ms, i.e., once for every transmitted frame. The ciphering code is generated by a ciphering unit 115 with the use of a mathematical algorithm and under the control of a key 116 which is unique to each mobile station. The algorithm may be used to generate a pseudo-random keystream in accordance with the present invention and as discussed further below.

The message bursts produced by the burst generator 110 are provided as input to an RF modulator 117. The RF modulator 117 is used for modulating a carrier frequency according to the $\pi/4$-DQPSK technique ($\pi/4$ shifted, differentially encoded quadrature phase shift key). The use of this technique implies that the information to be transmitted by the mobile station is differentially encoded, i.e., two bit symbols are transmitted as 4 possible changes in phase: $+$ or $-\pi/4$ and $+$ or $-3\pi/4$. The carrier frequency for the selected transmitting channel is supplied to the RF modulator 117 by a transmitting frequency synthesizer 118. The burst modulated carrier signal output of the RF modulator 117 is amplified by a power amplifier 119 and then transmitted to the base station through an antenna 120.

The mobile station receives burst modulated signals from the base station through an antenna 121 connected to a receiver 122. A receiver carrier frequency for the selected receiving channel is generated by a receiving frequency synthesizer 123 and supplied to a an RF demodulator 124. The RF demodulator 124 is used to demodulate the received carrier signal into an intermediate frequency signal. The intermediate frequency signal is then demodulated further by an IF demodulator 125 which recovers the original digital information as it existed prior to $\pi/4$-DQPSK modulation. The digital information is then passed through the equalizer 113 to a symbol detector 126 which converts the two-bit symbol format of the digital data provided by the equalizer 114 to a single bit data-stream.

The symbol detector 126 produces two distinct outputs: a first output, comprised of digitized speech data and FACCH data, and a second output, comprised of SACCH data. The first output is supplied to a modulo-2 adder 127 which is connected to a 2-burst deinterleaver 128. The modulo-2 adder 127 is connected to the ciphering unit 115 and is used to decipher the encrypted transmitted data by subtracting on a bit-by-bit basis the same pseudo-random keystream used by the transmitter in the base station to encrypt the data. The modulo-2 adder 127 and the 2-burst deinterleaver 128 reconstruct the speech/FACCH data by assembling and rearranging information derived from two consecutive frames of the digital data. The 2-burst deinterleaver 128 is coupled to two channel decoders 129, 130 which decode the convolutionally encoded speech/FACCH data using the reverse process of coding and check the cyclic redundancy check (CRC) bits to determine if any error has occurred. The channel decoders 129, 130 detect distinctions between the speech data on the one hand, and any FACCH data on the other, and route the speech data and the FACCH data to a speech decoder 131 and an FACCH detector 132, respectively. The speech decoder 131 processes the speech data supplied by the channel decoder 129 in accordance with a speech coder algorithm; e.g. VSELP, and generates an analog signal representative of the speech signal transmitted by the base station and received by the mobile station. A filtering technique may then be used to enhance the quality of the analog signal prior to broadcast by a speaker 133. Any FACCH messages detected by the FACCH detector 132 are forwarded to a microprocessor 134.

The second output of the symbol detector 126 (SACCH data) is supplied to a 22-burst deinterleaver 135. The 22-burst interleaver 135 reassembles and rearranges the SACCH data which is spread over 22 consecutive frames. The output of the 22-burst deinterleaver 135 is provided as input to a channel decoder 136. SACCH messages are detected by an SACCH detector 137 and the control information is transferred to the microprocessor 134.

The microprocessor 134 controls the activities of the mobile station and communications between the mobile station and the base station. Decisions are made by the microprocessor 134 in accordance with messages received from the base station and measurements performed by the mobile station. The microprocessor 134 is also provided with a terminal keyboard input and display output unit 138. The keyboard and display unit 138 allows the mobile station user to exchange information with the base station.

Figure 3:
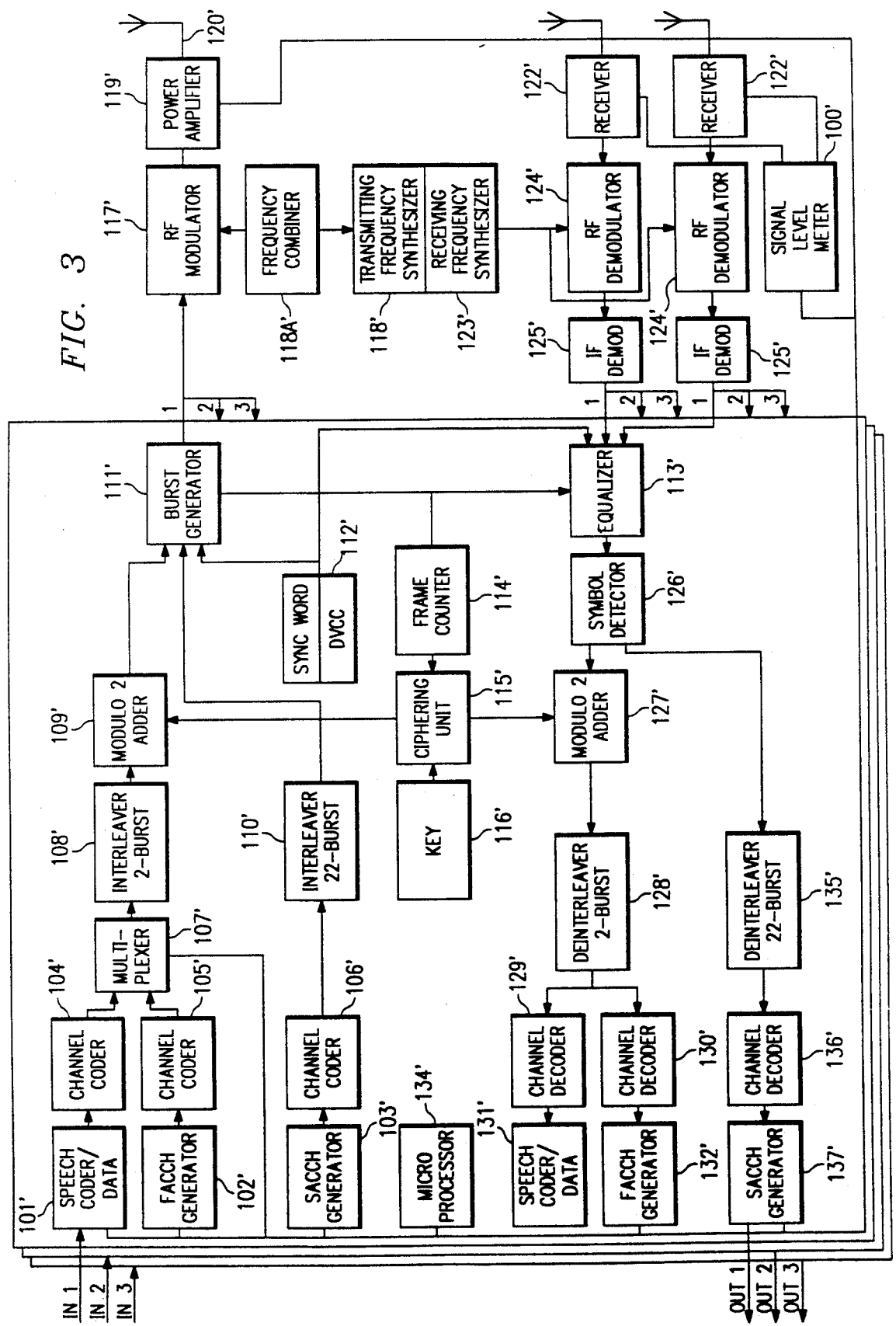
FIG. 3 is a schematic block diagram of base station equipment used in accordance with one embodiment of the system of the present invention.

Referring next to FIG. 3, there is shown a schematic block diagram of the base station equipment which are used in accordance with the present invention. A comparison of the mobile station equipment shown in FIG. 2 with the base station equipment shown in FIG. 3 demonstrates that much of the equipment used by the mobile station and the base station are substantially identical in construction and function. Such identical equipment are, for the sake of convenience and consistency, designated with the same reference numerals in FIG. 3 as those used in connection with FIG. 2, but are differentiated by the addition of a prime (') in FIG. 3.

There are, however, some minor differences between the mobile station and the base station equipment. For instance, the base station has, not just one but, two receiving antennas 121'. Associated with each of the receiving antennas 121' are a receiver 122', an RF demodulator 124', and an IF demodulator 125'. Furthermore, the base station includes a programmable frequency combiner 118A' which is connected to a transmitting frequency synthesizer 118'. The frequency combiner 118A' and the transmitting frequency synthesizer 118' carry out the selection of the RF channels to be used by the base station according to the applicable cellular frequency reuse plan. The base station, however, does not include a user keyboard and display unit similar to the user keyboard and display unit 138 present in the mobile station. It does however include a signal level meter 100' connected to measure the signal received from each of the two receivers 122' and to provide an output to the microprocessor 134'. Other differences in equipment between the mobile station the base station may exist which are well known in the art.

The discussion thus far has focused on the operational environment of the system of the present invention. A specific description of a particular embodiment of the present invention follows. As disclosed above and used hereinafter, the term "keystream" means a pseudo-random sequence of binary bits or blocks of bits used to encipher a digitally encoded message or data signal prior to transmission or storage in a medium which is susceptible to unauthorized access, e.g., an RF channel. A "keystream generator" means a device which generates a keystream by processing a secret key comprised of a plurality of bits. Encryption may be simply performed by a modulo-2 addition of the keystream to the data to be encrypted. Similarly, decryption may be performed by a modulo-2 subtraction of an identical copy of the keystream from the encrypted data.

Generally speaking, the keystream generator provides a mechanism, represented by elements 115 and 115' of FIGS. 2 and 3, respectively, for expanding a relatively small number of secret bits, i.e., the secret key, represented by elements 116 and 116', into a much larger number of keystream bits which are then used to encrypt data messages prior to transmission (or storage). To decrypt an encoded message, the receiver must "know" the index to the keystream bits used to encrypt the message. In other words, the receiver must not only have the same keystream generator and generate the same keystream bits as the transmitter, but also, the receiver keystream generator must be operated in synchronism with the transmitter keystream generator if the message is to be properly decoded. Synchronization is normally achieved by periodically transmitting from the encoding system to the decoding system the contents of every internal memory device, such as bit, block or message counters, which participate in the generation of the keystream bits. Synchronization may be simplified, however, by using arithmetic bit block counters, such as binary counters, and incrementing those counters by a certain amount each time a new block of keystream bits is produced. Such counters may form a part of a real-time, i.e. hours, minutes and seconds, clock chain. A keystream generator relying on the latter type of counters is known as the "time-of-day" driven keystream generator to which reference was made hereinabove.

It should be noted that the precise method used for bit-by-bit or block-by-block advancing of the keystream generator, and the particular method used for synchronizing the sending circuit with the receiving circuit, are the subject of co-pending patent application Ser. No. 556,102, entitled "Continuous Cipher Synchronization for Cellular Communication System", as mentioned above. The system of the present invention, as hereinafter described in detail, is directed to the efficient implementation of an effective encryption system which may be used, for example, to secure digital communication over RF channels in a cellular telecommunications system. The encryption system includes a keystream generator which produces a high number of keystream bits per second by performing a large number of boolean operations per second on a plurality of key bits contained in a secret key. The keystream generator of the present invention may be implemented with an integrated circuit having a simple microprocessor architecture.

Figure 4:
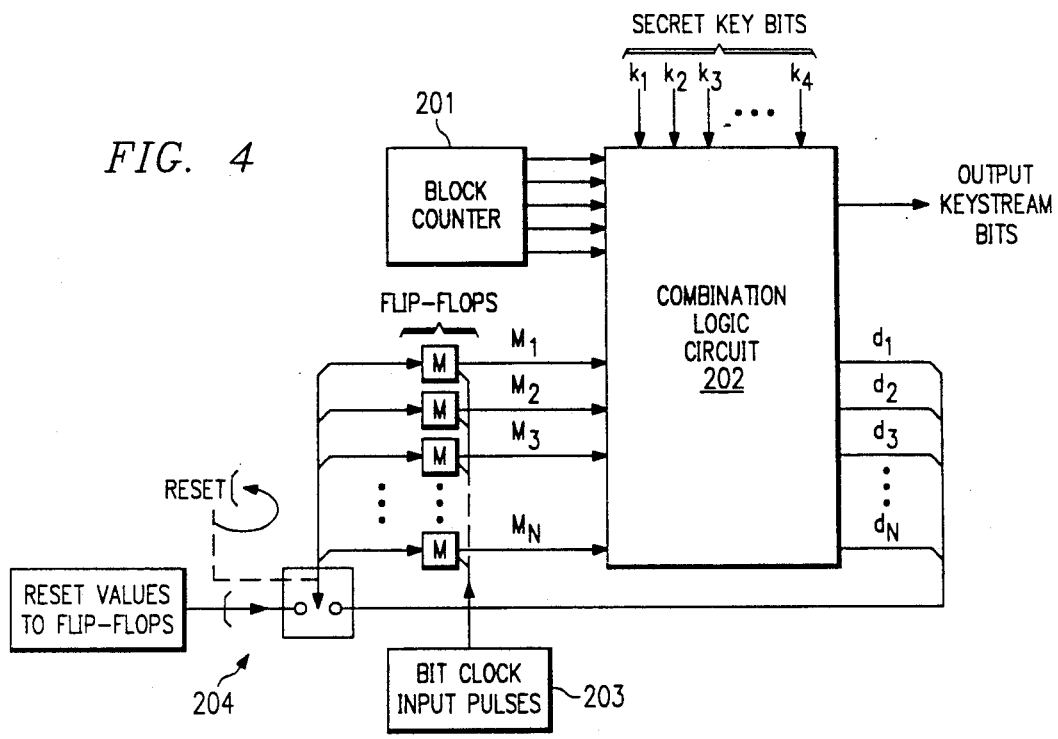
FIG. 4 is a schematic block diagram of a prior art keystream generator.

Referring now to FIG. 4, a schematic block diagram of a prior art keystream generator may now be seen. An optional block counter 201 provides a first multi-bit input to a combinatorial logic circuit 202. A plurality of one-bit memory elements, or flip-flops, m1, m2, m3 . . . mn provides a second multi-bit input to the combinatorial logic circuit 202. A portion of the output of the combinatorial logic circuit 202, consisting of one-bit outputs d1, d2, d3 . . . dn, is fed back to the flip-flops m1-mn. The outputs d1-dn become the next state of the flip-flops m1-mn, respectively, after each clock pulse in a series of bit clock input pulses 203 supplied to the flip-flops m1-mn. By suitable construction of the combinatorial logic circuit 202, the flip-flops m1-mn may be arranged to form a straight binary counter, a linear feedback shift register executing a maximum length sequence, or any other form of linear or non-linear sequential counters. In any event, each of the states of the flip-flops m1-mn and the state of the block counter 201 at the receiver end must be made equal to the states of the corresponding elements at the transmitter end. A reset or synchronization mechanism 204 is used to synchronize the receiver with the transmitter.

With continuing reference to FIG. 4, a plurality of secret key bits k1, k2, k3 . . . kn, forms a third multi-bit input to the combinatorial logic circuit 202. The number n of secret key bits is usually in the region of a hundred bits plus or minus ($+/-$) a factor of 2. It is desirable that each of the secret key bits k1-kn should, at a minimum, have the potential of affecting each of the bits in the keystream. Otherwise, an eavesdropper would need to break only a small subset of the secret key bits k1-kn in order to decipher and monitor the encrypted data. The risk of unauthorized interception, however, may be considerably reduced if the value (logical state) of each bit in the keystream is made to depend not only on the value of a particular secret key bit, but also on the value of all other secret key bits as well as the state of the block counter 201 and other internal memory states. Heretofore, the establishment of such a dependence would have entailed a prohibitive number of boolean operations. Assume, for example, that the secret key is composed of one hundred (100) secret key bits. If each of these secret key bits is to influence every bit in the keystream, a total of one hundred (100) combinatorial operations per keystream bit would be required. Thus, to produce ten thousand (10,000) keystream bits, a total of one million (1,000,000) combinatorial operations would be required and the number would be even greater if each keystream bit was also made to depend on one or more internal memory states. One of the objectives of the present invention is to significantly reduce the required number of combinatorial operations per keystream bit while maintaining the dependence of each keystream bit on every one of the secret key bits.

According to the present invention, the production of many thousands of pseudo-random keystream bits from, for example, a (hundred) 100 secret key bits may be viewed as a multi-stage expansion process. A plurality of expansion stages are cascaded together, each having a successively smaller expansion ratio. Expansion by the first stage is performed less frequently than by subsequent stages in order to minimize the number of required logical (boolean) operations per keystream bit. Additionally, the first expansion stage is constructed to provide a plurality of output bits which is highly dependent on the secret key bits, further reducing the number of logical operations which must be performed by the subsequent stages.

Figure 5:
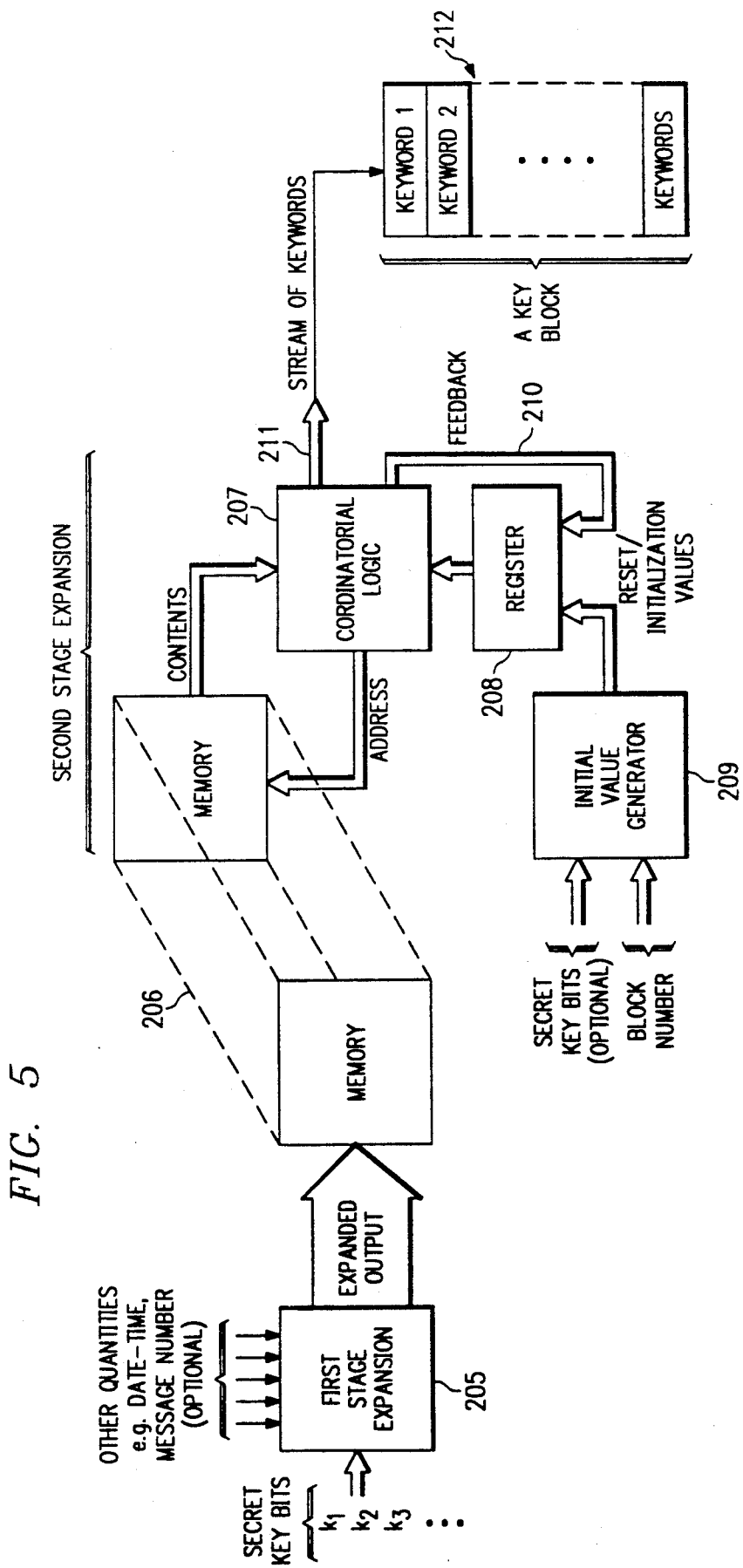
FIG. 5 is a schematic block diagram of a keystream generator circuit of an encryption system constructed in accordance with the present invention.

Referring next to FIG. 5, a schematic block diagram of a keystream generator system constructed in accordance with the teachings of the present invention may now be seen. A plurality of secret key bits k1, k2, k3 . . . are provided as input to a first stage expansion 205. The key bits k1, k2, k3 . . . may include some, but preferably all, of the secret key bits k1, k2, k3 . . . kn. Additional, or optional, inputs to the first stage expansion 205 may include the outputs of a message counter, a block counter, a date-time stamp representing the time or block count number at the start of a frame, or other variable outputs which may be synchronized by the sender and receiver. Any internal memory output which varies slowly with time may be used as an input to the first stage expansion 205. A slow changing input is desired because the first stage expansion 205 should be performed infrequently, e.g., once per message.

The first stage expansion 205 generates an expanded output which is considerably larger in size than the number of secret key bits k1, k2, k3 . . . The expanded output is stored in a memory device 206 which is accessed by a combinatorial logic circuit 207. The combinatorial logic 207 performs a second stage expansion as more fully set forth below. The output of a counter or register 208 forms an input to the combinatorial logic 207. The register 208 is initialized to a new starting state prior to the generation of each block of keystream bits. An initial value generator 209 provides the starting state for the register 208. The starting state, which will be different for each particular block of keystream bits, is a function of the block number of the particular block and, possibly, also a function of some subset of the secret key bits k1-kn.

A first output 210 of the combinatorial logic 207 is fed back to the register 208. The output 210 becomes the new state of the register 208 after each cycle of operation. A second output 211 of the combinatorial logic 207 forms the keystream bits which are to be mixed with the data stream as shown in FIGS. 2 and 3, above. The number of keystream bits produced per cycle at the output 211 may be any multiple of 2, i.e, 8, 16, 32, 56, etc. Such bits are collectively referred to as a "keyword". Some or all of the keywords produced at the output 211 prior to reinitialization of the register 208 are grouped into a keyblock 212. The keyblock 212 may, for example, consist of all the keywords produced in every cycle, or in every other cycle, preceding reinitialization of the register 208.

It will be appreciated by those skilled in the art that a conventional implementation of the keystream generator system depicted in FIG. 5 and discussed above might require a host of complex combinatorial logic circuits which, if realized separately by interconnecting a plurality of logic gates, i.e., AND, OR etc., would amount to a large and costly chip, useful only for a very specific application. An arithmetic and logic unit (ALU), on the other hand, is a standard component of a variety of small, low-cost and multi-purpose microprocessors. The present invention provides a means for realizing all of the required combinatorial logic functions with the use of such an ALU.

The conventional ALU, operating under the control of a program, can perform the combinatorial functions ADD, SUBTRACT, BITWISE EXCLUSIVE OR, AND, OR between any two 8-bit or 16-bit binary words. If the ALU is used to sequentially implement all of the boolean functions required in the device of FIG. 5, the ALU operating speed, measured in terms of the number of complete cycles per second that may be executed, would be substantially reduced. The multistage expansion used in the present invention, however, prevents such excessive reduction of ALU speed by minimizing the number of program instructions, i.e., instances of ALU utilization, per cycle for the most frequently executed combinatorial logic 207 through the infrequently periodic calculation of a large number of key-dependent functions in the first stage expansion 205. By the word "large" in the preceding sentence, is meant, for example, an order of magnitude larger than the number n of secret key bits.

Once the register 208 is initialized with a starting value, the combinatorial logic 207 will generate a stream of keywords at the output 211 and will continue to generate additional keywords each time the register 208 is reloaded with the feedback value at the output 210. Difficulties may arise, however, which can undermine the integrity of the keyword generation process. If, for example, the contents of the register 208 ever return to their initial value, the sequence of the keywords generated theretofore will repeat again. Similarity, if the contents of the register 208 return to a value (not necessarily the initial value) previously encountered in the generation of the current keyblock, the system is said to be "short cycling". For reasons alluded to earlier, e.g., the ease of unauthorized deciphering, it is undesirable that the sequence of keywords should begin to repeat, or that short cycling should occur, within the generation of a single keyblock. Moreover, if the contents of the register 208 at some point, say after the m'th keyword is generated, become equal to some value which existed or will exist after the m'th keyword during the generation of another keyblock, the two keyblocks will, from that point on, be identical—also an undesirable occurrence.

Hence, the combinatorial logic 207 and the associated register 208 (the "combinatorial logic/register combination"), when operated successively a number of times, should (i) not produce cycles shorter than the number of keywords per block; and (ii) produce a unique keyword sequence for every unique starting state of the register 208. To meet the latter requirement, no two different starting states should be capable of converging to the same state. Furthermore, both of the foregoing requirements should apply regardless of the contents of the memory 206. As explained in more detail below, the present invention alleviates these concerns and enhances the integrity of the keyword generation process.

When the state transition diagram of the combinatorial logic/register combination has converging forks, the combination may not be run in reverse through such a fork because of the ambiguity about which path to take. Therefore, if a process for operating the combination can be shown to be unambiguous or reversible, it is proof that converging forks do not exist in the state transition diagram. Such a process is described and discussed below.

Figure 6:
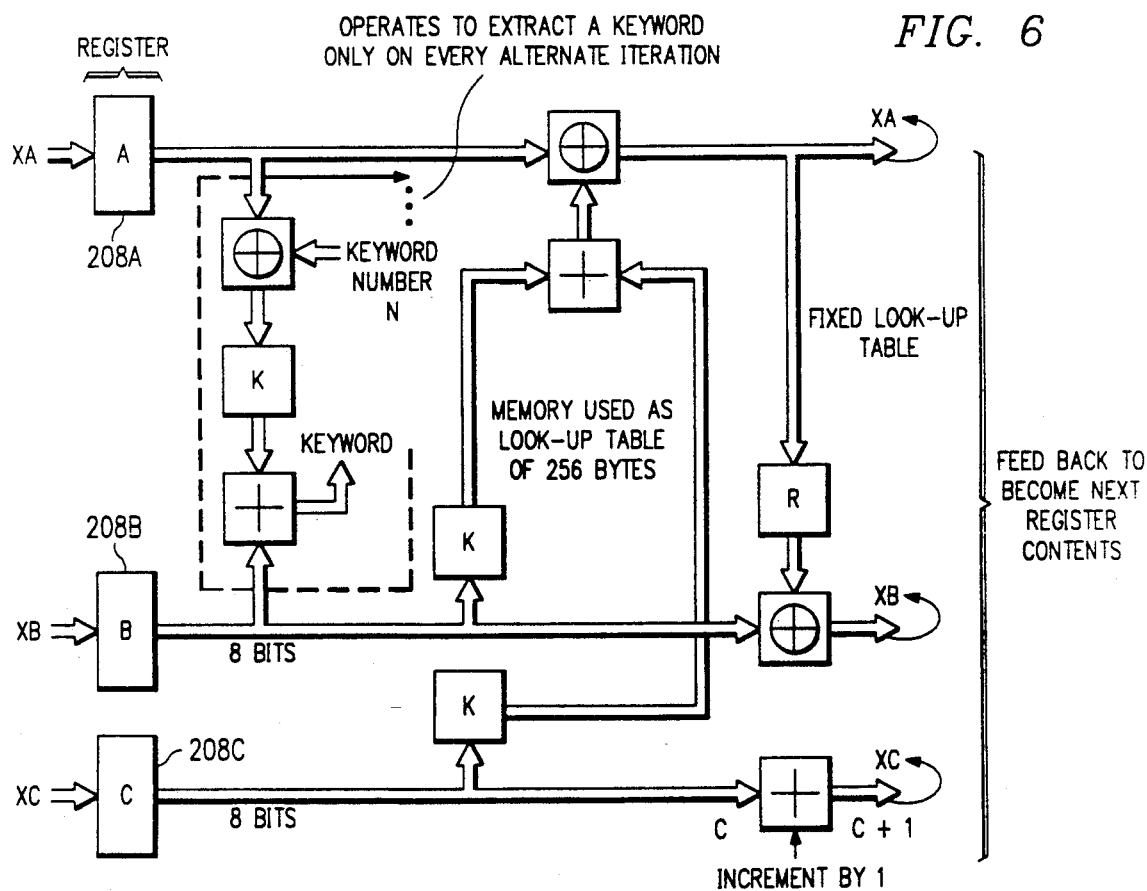
FIG. 6 is a partial schematic block diagram of a second expansion stage of the keystream generator shown in FIG. 5.

Referring next to FIG. 6, a partial schematic block diagram of the second expansion stage of the keystream generator shown in FIG. 5 may now be seen. The register 208 of FIG. 5 has been divided into three byte-length registers 208A, 208B, 208C in FIG. 6. The registers 208A, 208B, 208C may be, for example, 8-bit registers. Following initialization of the registers 208A, 208B, and 208C, new state values are calculated from the following formulas:

$$A' = A \# [K(B) + K(C)] \quad (1)$$

$$B' = B \# R(A) \quad (2)$$

$$C' = C + 1 \quad (3)$$

where,
A' is the new state value for the register 208A;
B' is the new state value for the register 208B;
C' is the new state value for the register 208C;
A is the current state value for the register 208A;
B is the current state value for the register 208B;
C is the current state value for the register 208C;
+ means word-length modulo additions, for example, byte wide modulo-256 additions;

\# means + (as defined above) or bitwize EXclusive OR (XOR);

K(B) is the value K located at address B of the memory 206 shown in FIG. 5;

K(C) is the value K located at address C of the memory 206 shown in FIG. 5;

Note: Each of the values K stored in the memory 206 has been previously calculated to be a complex function of all the secret keybits by the first stage expansion 205 shown in FIG. 5.

R(A) is the value located at address A in a fixed look-up table R. Alternatively, the bits of A are supplied as inputs to a combinatorial logic block which will produce an output R. The look-up table R, or alternatively, the combinatorial logic block should provide a number of output bits greater or equal to the word length of A and less or equal to the word length of B. In the case where A and B are both 8-bit bytes, for example, R will also be an 8-bit byte and the look-up table R will contain 256 values.

The value R should have a 1:1 mapping from input to output; that is, each possible state of the input bits should map to a unique output value. This ensures that the R function is reversible which, in turn, ensures that the whole process may be reversed by means of the following relationships:

$$C = C - 1 \quad (1)$$

$$B = B \#\# R'(A) \quad (2)$$

$$A = A \#\# [K(B) + K(C)] \quad (3)$$

where,

− means word-length modulo subtraction;

\#\# means the inverse operation of \#, i.e., either—(as defined above) or bitwise XOR; and R′ is the inverse of the 1:1 look-up table, or the combinatorial logic, R.

This reversibility demonstrates that there are no converging forks in the state transition diagram of the combinatorial logic/register combination and, hence, guarantees that every starting state will produce a unique sequence of keywords. Furthermore, the process guarantees a minimum cycle length, since C is incremented only by 1 and will not return to its initial value until after $2^w$ iterations, where w is the word length used. For example, if all of the values A, B, C, R and K are 8-bit bytes, the minimum cycle length will be 256. If, upon every iteration (cycle), a keyword (byte) is extracted, a total of 256 bytes may be extracted without the danger of premature repetition of the sequence. If, on the other hand, the keyword is extracted every other iteration, a total of 128 keywords may be extracted without premature repetition of the sequence. By the word "extracted" in the preceding two sentences, is meant the collection and placement of keywords into a keyblock such as the keyblock 212 in FIG. 5. A particular method of keyword extraction which may be used in the present invention is described immediately below.

In connection with FIG. 6, a process was described for computing the outputs 210 of the combinatorial logic 207 which are fed back to the register 208. Generally speaking, any one of the intermediate quantities A, B or C may be directly extracted and used as a keyword on each iteration. Letting S=(A, B, C) stand for the current state of the combinatorial logic/register combination, the combination will transit through a sequence of states S0, S1, S2, S3, S4, S5, S6, S7 . . . following initialization to S0. If, however, in the computation of a subsequent keyblock the register 208 is initialized, for example, to S2, the resulting sequence S2, S3, S4, S5, S6, S7 . . . will be identical to the first sequence but shifted by two keywords (S0, S1). Therefore, if a value A, B, or C from a state S is directly used as a keyword, such an identity may appear between different keyblocks. To prevent this, the system of the present invention modifies each of the values extracted in accordance with the value's position in the keyblock so that if the same value is extracted to a different keyword position in another block, a different keyword will result. An exemplary method for achieving the latter objective is set forth below.

Let N be the number of keywords in the keyblock currently being computed and S=(A, B, C) be the current state of the register 208 in the iteration during which the keyword N is to be extracted. The value of the keyword W(N) may be calculated as follows:

$$W(N) = B + 'K[A+N]$$

where,

+ means XOR;

+′ means either + (as defined immediately above) or word length-modulo addition.

Other suitable exemplary methods for keyword extraction may include the following:

$$W(N) = B + K[R(A+N)] \text{ or}$$

$$W(N) = R[A+N] + K[B+N] \text{ and so forth.}$$

While the precise nature of the keyword extraction method is not material to the operation of the present invention, it is recommended that, to obtain the best cryptographic properties in accordance with the system of the present invention, the values of the keywords extracted should be a function of their respective positions within a keyblock.

As can be seen from the above description of various embodiments of the system of the invention, there is included a method and means for reducing the amount of specific logic hardware required to generate a pseudo-random bit sequence which is a function of, among other parameters, a selected number of secret key bits and which is to be used enciphering a stream of digital information. The system involves timesharing under program control a general purpose Arithmetic and Logic Unit (ALU) of the type commonly found in conventional microprocessor integrated circuits chips. The system minimizes the number of ALU operations needed per output bit, for a selected degree of complexity of dependance upon key bits, by the precalculation and storage in memory of a set of digital values larger in number than the number of original input-key bits. Each one of the stored digital values is a different and complex logical function of the key bits, and optionally also a function of other parameters. The digital values stored in memory are used as a look-up table by a subsequent calculation stage which is executed a large number of times to produce a large number of pseudo-random output bits.

It should be understood that the pseudo-random bit sequence generator of the system of the present invention may use many different variables, along with the secret key bits, in the precalculation of digital values. For example, the following parameters may be used for this purpose: message number, sender's identification code or telephone number, intended receiving correspondent's identification code or telephone number, time-of-day, date, a counter value at the start of the message, call number, random number exchanged between the correspondents, or any other bits or quantity upon which the sender and the receiver(s) have a means of agreeing.

Based upon the foregoing discussion it should be clear that the system uses the precalculated and stored digital values by first initializing the state of a number of flip-flops or register stages that form the inputs to a combinatorial logic circuit which computes the next state of a set of values. The computed values are then transferred into the register stages, upon completion of the next-state computations, and those new values are used as a new starting state by the combinatorial logic to iteratively generate a succession of additional states the logical values of which is further combined to form the desired output pseudo-random bit sequence.

The flip-flops or register stages are initialized to a value which can be dependant upon at least an identification code or block count of the block of pseudo-random bits currently being generated and, optionally, upon other parameters agreed between the correspondents, such as some or all of the secret key bits. Such dependance of the initialization value, preferably, but not necessarily, produces a unique initial register state for each unique block identification number.

The sub-group of bits generated upon each transition of the register/combinatorial logic state machine between each successive state is a function not only of the register states but also of position of the sub-group within the pseudo-random bit block currently being generated by the machine. The state machine is guaranteed to produce a unique sequence of pseudo-random bits in a particular block for each different block identification code or block number used to initialize the state machine's register stages, by ensuring that different starting stages cannot on some subsequent iteration lead to the same intermediate state.

It can also be seen from the forgoing description that the state machine of the present invention, which is composed of a number of register stages connected to a combinatorial logic circuit and which employs a key-dependant look-up table having arbitrary contents, exhibits cyclic behavior on successive iterations. A guaranteed minimum cycle length is ensured by providing that a sub-group of the register stages execute a defined cyclic sequence such as, for example, a regular incrementing binary count sequence of at least a minimum length. The state machine also includes within it one or more fixed look-up tables, on which the correspondents have agreed, and which have a 1:1 mapping property from input address to output address value and are therefore invertible.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

What is claimed is:

1. A method of generating a pseudo-random bit sequence for use in enciphering digital data in which said bit sequence is a function of a plurality of selected key bits, said method comprising:
   generating a plurality of multi-bit values each of which is a function of at least some of said selected key bits;
   storing each of said plurality of multi-bit values in a discrete location in a memory;
   storing each of a plurality of multi-bit values in a look-up table;
   generating a sequence of values in a register having a present value at a particular moment by changing the present value contained in said register in response to each cycle of operation;
   cyclically calculating a sequence of multi-bit values in accordance with a first preselected algorithm each of which values is a function of at least one of the multi-bit values stored in either said look-up table or in said memory and at least part of the value contained in said register;
   cyclically resetting the present value contained in said register with a value obtained as a result of each calculation;
   cyclically calculating a multi-bit keyword which is a function of a value obtained as a result of each multi-bit value calculation; and
   sequentially combining at least some of said multi-bit keywords into said pseudo-random bit sequence.

2. A method of generating a pseudo-random bit sequence for use in enciphering digital data as set forth in claim 1, wherein said step of generating a plurality of multi-bit values includes generating values which are each a function of all of said selected key bits.

3. A method of generating a pseudo-random bit sequence for use in enciphering digital data as set forth in claim 1, which includes the additional step of periodically initializing the present value contained in said register.

4. A method of generating a pseudo-random bit sequence for use in enciphering digital data as set forth in claim 1, wherein said step of generating a plurality of multi-bit values includes generating values which are each a function of both at least some of said selected key bits and of the value contained in a counter which is periodically incremented in value at a rate which is slow in comparison to the cyclic repetition of said calculations.

5. A method of generating a pseudo-random bit sequence for use in enciphering digital data as set forth in claim 1, wherein said step of generating a sequence of values in a register includes storing a plurality of discrete bytes of data in said register and incrementing only one of said bytes in response to each cycle of operation.

6. A method of generating a pseudo-random bit sequence for use in enciphering digital data as set forth in claim 5, wherein said step of generating a sequence of values in a register includes storing at least three discrete bytes of data in said register and incrementing only one of said bytes in response to each cycle of operation.

7. A method of generating a pseudo-random bit sequence for use in enciphering digital data as set forth in claim 5, wherein said step of calculating a sequence of multi-bit keywords includes making said calculations in accordance with an algorithm in which each calculated value is a function of at least one multi-bit value stored, respectively, at at least one discrete location in said memory and at least one of said discrete bytes of data contained in said register.

8. A method of generating a pseudo-random bit sequence for use in enciphering digital data as set forth in claim 7, wherein said step of calculating a sequence of multi-bit values includes making said calculations in accordance with at least three separate algorithms in which each value calculated with said first algorithm is a function of at least one multi-bit value stored, respectively, at one discrete location in either said memory or in said look-up table and a first one of said discrete bytes of data contained in said register; each value calculated with said second algorithm is a function of a multi-bit value stored at a discrete location in said look-up table and a second one of said discrete bytes of data contained in said register; and each value calculated with said third algorithm is a function of the third one of said discrete bytes of data contained in said register and an incremental value added thereto.

9. A method of generating a pseudo-random bit sequence for use in enciphering digital data as set forth in claim 8, wherein said first algorithm is $$A' = A \# [K(B) + K(C)]$$

where
A is the value of the first one of said discrete bytes of data; K(B) and K(C) signify that B and C, respectively, are used as the addresses in said memory from which to fetch a value K; + represents an addition modulo the word length; and # represents either addition modulo the word length or bitwise Exclusive OR with the whole wordlength;
said second algorithm is $$B' = B \# R(A)$$

where
B is the value of the second one of said discrete bytes of data; R(A) signifies that A is the address in a fixed look-up table from which to fetch a value R or that the bits of A are to be applied as the inputs of a combinatorial logic block which will give the output R; and # represents either addition modulo the word length or bitwise Exclusive OR with the whole wordlength; and
said third algorithm is $$C' = C + 1$$

where
C is the value of the third one of said discrete bytes of data; and + represents an addition modulo the word length.

10. A method of generating a pseudo-random bit sequence for use in enciphering digital data as set forth in claim 9, wherein the look-up table or combinatorial logic which yields the value for the R having a number of output bits which is at least as great as the wordlength of A and less than or equal to the wordlength of B.

11. A method of generating a pseudo-random bit sequence for use in enciphering digital data as set forth in claim 10, wherein
every possible state of input bits to the look-up table maps to a unique output value for R.

12. A method of generating a pseudo-random bit sequence for use in enciphering digital data as set forth in claim 5, wherein said step of generating a sequence of values in a register includes storing at least three discrete bytes of data in said register, said step of calculating a sequence of multi-bit values includes calculating at least three discrete values, and said step of cyclically resetting the present value contained in said register includes replacing each of said at least three discrete bytes of data in said register with respective ones of said at least three discrete calculated values following each calculation step.

13. A method of generating a pseudo-random bit sequence for use in enciphering digital data as set forth in claim 12, wherein said step of cyclically calculating a multi-bit keyword includes selecting at least one of said at least three discrete calculated values as a part of said keyword.

14. A method of generating a pseudo-random bit sequence for use in enciphering digital data as set forth in claim 12, wherein said step of cyclically calculating a multi-bit keyword includes selecting at least one of said at least three discrete calculated values and calculating said keyword in accordance with a second algorithm in which said keyword is a function of said at least one selected calculated value.

15. A method of generating a pseudo-random bit sequence for use in enciphering digital data as set forth in claim 14, which includes the additional step of initializing the value in said register at the beginning of each keyblock of sequential keywords combined into said pseudo-random bit sequence and wherein said second algorithm defines said keyword as a function of at least one of the values calculated in accordance with said first algorithm as well as the sequential position of the particular keyword being calculated within the keyblock.

16. A method of generating a pseudo-random bit sequence for use in enciphering digital data as set forth in claim 14, which includes the additional step of initializing the value in said register at the beginning of each keyblock of sequential keywords and wherein said step of cyclically calculating a multi-bit keyword includes selecting only one of said three discrete calculated values and said second algorithm is $$W(N) = B +' K[A+N]$$

where
W(N) is the keyword to be calculated; N is the sequential position of the particular keyword being calculated within the keyblock; A is the value of the first one of said discrete bytes of data, B is the second one of said discrete bytes of data; + means Exclusive OR, K[A+N] signifies that the Exclusive Or combination of the A and N is to be used as an address in the memory from which to fetch the value of K; and +' can either be Exclusive Or or addition modulo the wordlength.

17. A method of generating a pseudo-random bit sequence for use in enciphering digital data as set forth in claim 14, which includes the additional step of initializing the value in said register at the beginning of each keyblock of sequential keywords and wherein said step of cyclically calculating a multi-bit keyword includes selecting only one of said three discrete calculated values and said second algorithm is $$W(N) = B + K[R(A+N)]$$

where
W(N) is the keyword to be calculated; N is the sequential position of the particular keyword being calculated within the keyblock; A is the value of the first one of said discrete bytes of data; B is the second one of said discrete bytes of data, R(A+N) signifies that A+N is the address in a fixed look-up table from which to fetch a value R or that the bits of A+N are to be applied as the inputs of a combinatorial logic block which will give the output R; + means Exclusive OR; and K[R(A+N)] signifies that the value R found in the look-up table at the address of the Exclusive Or combination of A and N is to be used as an address in the memory from which to fetch the value of K.

18. A method of generating a pseudo-random bit sequence for use in enciphering digital data as set forth in claim 14, which includes the additional step of initializing the value in said register at the beginning of each keyblock of sequential keywords and wherein said step of cyclically calculating a multi-bit keyword includes selecting only one of said three discrete calculated values and said second algorithm is $$W(N) = R[A+N] + K[B+N]$$

where
W(N) is the keyword to be calculated; N is the sequential position of the particular keyword being calculated within the keyblock; A is the value of the first one of said discrete bytes of data; B is the second one of said discrete bytes of data; R[A+N]) signifies that A+N is the address in a fixed look-up table from which to fetch a value R or that the bits of A+N are to be applied as the inputs of a combinatorial logic block which will give the output R; + means Exclusive OR; and K[B+N] signifies that the address of the Exclusive Or combination of B and N is to be used as an address in the memory from which to fetch the value of K.

19. A system for generating a pseudo-random bit sequence for use in enciphering digital data in which said bit sequence is a function of a plurality of selected key bits, said system comprising:
means for generating a plurality of multi-bit values each of which are a function of at least some of said selected key bits;
means for storing each of said plurality of multi-bit values in a discrete location in a memory;
means for storing each of a plurality of multi-bit values at a discrete location in a look-up table;
means for generating a sequence of values in a register having a present value at a particular moment by changing the present value contained in said register in response to each cycle of operation;
means for cyclically calculating a sequence of multi-bit values in accordance with a first preselected algorithm each of which values is a function of at least one of the multi-bit values stored in either said look-up table or in said memory and at least part of the value contained in said register;
means for cyclically resetting the present value contained in said register with a value obtained as a result of each calculation;
means for cyclically calculating a multi-bit keyword which is a function of a value obtained as a result of each multi-bit value calculation; and
means for sequentially combining at least some of said multi-bit keywords into said pseudo-random bit sequence.

20. A system for generating a pseudo-random bit sequence for use in enciphering digital data as set forth in claim 19, wherein said means for generating a plurality of multi-bit values includes means for generating values which are each a function of all of said selected key bits.

21. A system for generating a pseudo-random bit sequence for use in enciphering digital data as set forth in claim 19, which also includes means for periodically initializing the present value contained in said register.

22. A system for generating a pseudo-random bit sequence for use in enciphering digital data as set forth in claim 19, wherein said means for generating a plurality of multi-bit values includes means for generating values which are each a function of both at least some of said selected key bits and of the value contained in a counter which is periodically incremented in value at a rate which is slow in comparison to the cyclic repetition of said calculations.

23. A system for generating a pseudo-random bit sequence for use in enciphering digital data as set forth in claim 19, wherein said means for generating a sequence of values in a register includes means for storing a plurality of discrete bytes of data in said register and means for incrementing only one of said bytes in response to each cycle of operation.

24. A system for generating a pseudo-random bit sequence for use in enchiphering digital data as set forth in claim 23, wherein said means for generating a sequence of values in a register includes means for storing at least three discrete bytes of data in said register and means for incrementing only one of said bytes in response to each cycle of operation.

25. A system for generating a pseudo-random bit sequence for use in enciphering digital data as set forth in claim 23, wherein said means for calculating a sequence of multi-bit keywords includes means for calculating said values in accordance with an algorithm in which each calculated value is a function of at least one multi-bit value stored, respectively, at at least one discrete location in said memory and at least one of said discrete bytes of data contained in said register.

26. A system for generating a pseudo-random bit sequence for use in enchiphering digital data as set forth in claim 25, wherein said means for calculating a sequence of multi-bit values includes means for making said calculations in accordance with three separate algorithms in which each value calculated with said first algorithm is a function of at least one multi-bit value stored, respectively, at at least one discrete location in either said memory or in said look-up table and a first one of said discrete bytes of data contained in said register; each value calculated with said second algorithm is a function of a multi-bit value stored at a discrete location in said look-up table and a second one of said discrete bytes of data contained in said register; and each value calculated with said third algorithm is a function of the third one of said discrete bytes of data contained in said register and an incremental value added thereto.

27. A system for generating a pseudo-random bit sequence for use in enciphering digital data as set forth in claim 26, wherein said first algorithm is $$A' = A \# [K(B) + K(C)]$$

where
- A is the value of the first one of said discrete bytes of data; K(B) and K(C) signify that B and C, respectively, are used as the addresses in said memory from which to fetch a value K; + represents an addition modulo the word length; and # represents either addition modulo the word length or bitwise Exclusive OR with the whole wordlength; said second algorithm is $$B' = B \# R(A)$$

where
- B is the value of the second one of said discrete bytes of data; R(A) signifies that A is the address in a fixed look-up table from which to fetch a value R or that the bits of A are to be applied as the inputs of a combinatorial logic block which will give the output R; and # represents either addition modulo the word length or bitwise Exclusive OR with the whole wordlength; and
said third algorithm is $$C = C + 1$$

where
- C is the value of the third one of said discrete bytes of data; and + represents an addition modulo the word length.

28. A system for generating a pseudo-random bit sequence for use in enciphering digital data as set forth in claim 27, wherein the look-up table or combinatorial logic which yields the value for the R having a number of output bits which is at least as great as the wordlength of A and less than or equal to the wordlength of B.

29. A system for generating a pseudo-random bit sequence for use in enciphering digital data as set forth in claim 28, wherein every possible state of input bits to the look-up table maps to a unique output value for R.

30. A system for generating a pseudo-random bit sequence for use in enciphering digital data as set forth in claim 23, wherein said means for generating a sequence of values in a register includes means for storing at least three discrete bytes of data in said register, said means for calculating a sequence of multi-bit values includes means for calculating resetting the present value contained in said register includes means for replacing each of said three discrete bytes of data in said register with respective ones of said at least three discrete calculated values following each calculation step.

31. A system for of generating a pseudo-random bit sequence for use in enciphering digital data as set forth in claim 30, wherein said means for cyclically calculating a multi-bit keyword includes means for selecting at least one of said at least three discrete calculated values as a part of said keyword.

32. A system for of generating a pseudo-random bit sequence for use in enciphering digital data as set forth in claim 30, wherein said means for cyclically calculating a multi-bit keyword includes means for selecting at least one of said at least three discrete calculated values and means for calculating said keyword in accordance with a second algorithm in which said keyword is a function of said at least one selected calculated value.

33. A system for generating a pseudo-random bit sequence for use in enciphering digital data as set forth in claim 32, which also includes means for initializing the value in said register at the beginning of each keyblock of sequential keywords combined into said pseudo-random bit sequence and wherein said second algorithm defines said keyword as a function of at least one of the values calculated in accordance with said first algorithm as well as the sequential position of the particular keyword being calculated within the keyblock.

34. A system for generating a pseudo-random bit sequence for use in enciphering digital data as set forth in claim 32, which also includes means for initializing the value in said register at the beginning of each keyblock of sequential keywords and wherein said means for cyclically calculating a multi-bit keyword includes means for selecting only one of said three discrete calculated values and said second algorithm is $$W(N) = B + 'K[A + N]$$

where
- W(N) is the keyword to be calculated; N is the sequential position of the particular keyword being calculated within the keyblock; A is the value of the first one of said discrete bytes of data; B is the second one of said discrete bytes of data; + means Exclusive OR, K[A+N] signifies that the Exclusive Or combination of the A and N is to be used as an address in the memory from which to fetch the value of K; and +' can either be Exclusive Or or addition modulo the wordlength.

35. A digital communication system in which the streams of digital data being transmitted and received are cryptographically encoded to provide security of telecommunications, said system comprising:
- means for adding a pseudo-random keystream of binary bits to the information carrying digital signal of at least one transmitter and at least one receiver in said system to create streams of digital data to be transmitted and received within said system;
- means for generating said pseudo-random keystream of binary bits which includes:
- means for storing each of a plurality of multi-bit values in a discrete location;
- means for generating a sequence of values in a register by changing the present value contained in said register in response to each cycle of operation;
- means for cyclically calculating a sequence of multi-bit values in accordance with a first preselected algorithm each of which values is a function of at least one of said stored multi-bit values and the value contained in said register;
- means for cyclically resetting the contents of said register with a value obtained as a result of each calculation;
- means for cyclically calculating a multi-bit keyword which is a function of a value obtained as a result of each multi-bit value calculation; and
- means for sequentially combining at least some of said multi-bit keywords into said pseudo-random keystream of binary bits.

36. A digital communications system as set forth in claim 35, wherein said means for generating said pseudo-random keystream of binary bits includes means for generating said keystream as a function of a plurality of selected secret key bits, comprising:
- means for generating a plurality of multi-bit values each of which are a function of at least some of said selected key bits; and said means for storing each of a plurality of multi-bit values at a discrete location includes means for storing each of said plurality of generated multi-bit values.

37. A digital communications system as set forth in claim 35, which also includes means for periodically initializing the contents of said register.

38. A digital communications system as set forth in claim 36, wherein said means for generating a plurality of multi-bit values includes means for generating values which are each a function of both at least some of said selected key bits and of the value contained in a counter which is periodically incremented in value at a rate which is slow in comparison to the cyclic repetition of said calculations.

39. A digital cellular communications system as set forth in claim 35, wherein said means for generating a sequence of values in a register includes means for storing a plurality of discrete bytes of data in said register and means for incrementing only one of said bytes in response to each cycle of operation.

40. A digital cellular communications system as set forth in claim 39, wherein said means for generating a sequence of values in a register includes means for storing at least three discrete bytes of data in said register and means for incrementing only one of said bytes in response to each cycle of operation.

41. A digital cellular communications system as set forth in claim 39, wherein said means for calculating a sequence of multi-bit values includes means for calculating said values in accordance with an algorithm in which each calculated value is a function of at least two multi-bit values stored, respectively, at at least two discrete locations in said memory and at least one of said discrete bytes of data contained in said register.

42. A method of reducing the amount of logic hardware needed to generate a pseudo-random bit sequence to be used for enciphering a stream of digital information, said bit sequence being a function of plurality of selected key bits, said method comprising:
storing in memory a set of digital values larger in number than the number of selected key bits and each of which values is a logical function of at least some of said key bits;
iteratively calculating a sequence of multi-bit values with a general purpose microprocessor under program control each of which values is a function of at least one of the digital values stored in memory; and
assembling at least part of said calculated sequence of values into said pseudo-random bit sequence.

43. A method of reducing the amount of logic hardware needed to generate a pseudo-random bit sequence as set forth in claim 42 wherein said step of storing in memory also includes the steps of:
generating a plurality of multi-bit values each of which is a function of at least some of said selected key bits;
storing each of said plurality of multi-bit values in a discrete location in a memory.

44. A method of reducing the amount of logic hardware needed to generate a pseudo-random bit sequence as set forth in claim 43, wherein said step of generating a plurality of multi-bit values includes generating values which are each a function of all of said selected key bits.

45. A method of reducing the amount of logic hardware needed to generate a pseudo-random bit sequence as set forth in claim 43, which also includes the step of:
generating a sequence of values in a register by changing the present value contained in said register in response to each cycle of operation.

46. A method of reducing the amount of logic hardware needed to generate a pseudo-random bit sequence as set forth in claim 45, wherein said step of iteratively calculating a sequence of multi-bit values includes the following steps:
cyclically calculating a sequence of multi-bit values in accordance with a first preselected algorithm each of which values is a function of at least one of the stored digital values and at least part of the value contained in said register;
cyclically resetting the contents of said register with a value obtained as a result of each calculation.

47. A method of reducing the amount of logic hardware needed to generate a pseudo-random bit sequence as set forth in claim 45, which includes the additional step of periodically initializing the contents of said register.

48. A method of reducing the amount of logic hardware needed to generate pseudo-random bit sequence as set forth in claim 43, wherein said step of generating a plurality of multi-bit values includes generating values which are each a function of both at least some of said selected key-bits and of the value contained in a counter which is periodically incremented in value at a rate which is slow in comparison to the cyclic repetition of said calculations.

49. A method of reducing the amount of logic hardware needed to generate a pseudo-random bit sequence as set forth in claim 45, wherein said step of generating a sequence of values in a register includes storing a plurality of discrete bytes of data in said register and incrementing only one of said bytes in response to each cycle of operation.

50. A method of reducing the amount of logic hardware needed to generate a pseudo-random bit sequence as set forth in claim 45, wherein said step of generating a sequence of values in a register includes storing at least three discrete bytes of data in said register and incrementing only one of said bytes in response to each cycle of operation.

51. A method of reducing the amount of logic hardware needed to generate a pseudo-random bit sequence as set forth in claim 45, wherein said step of iteratively calculating a sequence of multi-bit values includes making said calculations in accordance with an algorithm in which each calculated value is a function of at least one of said stored digital values and at least one of said discrete bytes of data contained in said register.

52. A method of reducing the amount of logic hardware needed to generate a pseudo-random bit sequence as set forth in claim 50, wherein said step of iteratively calculating a sequence of multi-bit values includes making said calculations in accordance with at least three separate algorithms in which each value calculated with said first algorithm is a function of at least one of said stored digital values and a first one of said discrete bytes of data contained in said register; each value calculated with said second algorithm is a function of a stored digital value and a second one of said discrete bytes of data contained in said register; and each value calculated with said third algorithm is a function of the third one of said discrete bytes of data contained in said register and an incremental value added thereto.

53. A method of generating a pseudo-random bit sequence for use in enciphering digital data, said method comprising:
- generating a plurality of multi-bit values;
- storing said plurality of multi-bit values at discrete locations;
- generating a sequence of values in a register having a present value at a particular moment by changing the present value contained in said register in response to each cycle of operation;
- cyclically calculating a sequence of multi-bit values in accordance with a first preselected algorithm each of which values is a function of at least one of said stored multi-bit values and the value contained in said register;
- cyclically resetting the present value contained in said register with a value obtained as a result of each multi-bit value calculation;
- cyclically calculating a multi-bit keyword which is a function of a value obtained as a result of each multi-bit value calculation;
- sequentially combining at least part of said multi-bit keywords into said pseudo-random bit sequence.

54. A method of generating a pseudo-random bit sequence for use in enciphering digital data as set forth in claim 53, wherein said bit sequence is a function of a plurality of selected key bits and which also includes the step of:
- generating a plurality of multi-bit values each of which are a function of at least some of said selected key bits; and wherein said step of storing a plurality of multi-bit values at discrete locations includes storing each of said generated multi-bit values at a discrete location in a memory.

55. A method of generating a pseudo-random bit sequence for use in enciphering digital data as set forth in claim 54, wherein said step of generating a plurality of multi-bit values includes generating values which are each a function of all of said selected key bits.

56. A method of generating a pseudo-random bit sequence for use in enciphering digital data as set forth in claim 53, which includes the additional step of periodically initializing the present value contained in said register.

57. A method of generating a pseudo-random bit sequence for use in enciphering digital data as set forth in claim 54, wherein said step of generating a plurality of multi-bit values includes generating values which are each a function of both at least some of said selected key bits and of the value contained in a counter which is periodically incremented in value at a rate which is slow in comparison to the cyclic repetition of said calculations.

58. A method of generating a pseudo-random bit sequence for use in enciphering digital data as set forth in claim 53, wherein said step of generating a sequence of values in a register includes storing a plurality of discrete bytes of data in said register and incrementing only one of said bytes in response to each cycle of operation.

59. A method of generating a pseudo-random bit sequence for use in enciphering digital data as set forth in claim 58, wherein said step of generating a sequence of values in a register includes storing at least three discrete bytes of data in said register and incrementing only one of said bytes in response to each cycle of operation.

60. A method of generating a pseudo-random bit sequence for use in enciphering digital data as set forth in claim 58, wherein said step of calculating a sequence of multi-bit keywords includes making said calculations in accordance with an algorithm in which each calculated value is a function of at least one multi-bit value stored, respectively, at least one discrete location and at least one of said discrete bytes of data contained in said register.

61. A method of generating a pseudo-random bit sequence for use in enciphering digital data as set forth in claim 59, wherein said step of calculating a sequence of multi-bit values includes making said calculations in accordance with at least three separate algorithms in which each value calculated with said first algorithm is a function of at least one multi-bit value stored, respectively, at one discrete location and a first one of said discrete bytes of data contained in said register; each value calculated with said second algorithm is a function of a multi-bit value stored at a discrete location and a second one of said discrete bytes of data contained in said register; and each value calculated with said third algorithm is a function of the third one of said discrete bytes of data contained in said register and an incremental value added thereto.

62. A method of generating cryptographic variables for use in a communications system comprising the steps of:
- storing a plurality of multi-bit values in a memory;
- initializing a register to a starting multi-bit value; and
- iteratively calculating a new value for said register in accordance with an algorithm wherein at least some of the bits of the new register value calculated at each iteration are the result of combining at least some of the bits of the previous register value with at least some of the bits of one of the values stored in said memory.

63. A method according to claim 62 wherein said memory comprises a look-up table.

64. A method according to claim 63 wherein said register comprises a plurality of 8-bit registers and said look-up table containe 256 values.

65. A method according to claim 62 wherein at least some of the values stored in said memory are a function of secret data.

66. A system of generating cryptographic variables comprising:
- means for storing a plurality of multi-bit values in a memory;
- means for initializing a register to a starting multi-bit value; and
- means for iteratively calculating a new value for said register in accordance with an algorithm wherein at least some of the bits of the new register value calculated at each iteration are the result of combining at least some of the bits of the previous register value with at least some of the bits of one of the values stored in said memory.

67. A system according to claim 66 wherein said memory comprises a look-up table.

68. A system according to claim 67 wherein said register comprises a plurality of 8-bit registers and said look-up table contains 256 values.

69. A system according to claim 66 wherein at least some of the values stored in said memory are a function of secret data.

* * * * *

UNITED STATES PATENT AND TRADEMARK OFFICE
CERTIFICATE OF CORRECTION

PATENT NO. : 5,148,485
DATED : Sept. 15, 1992
INVENTOR(S) : Paul Dent

It is certified that error appears in the above-identified patent and that said Letters Patent is hereby corrected as shown below:

On the title page:

Title [54], page 1; delete "ENCRYPTON"
insert --ENCRYPTION--

Column 1, line 1; delete "ENCRYPTON"
insert --ENCRYPTION--

Column 8, line 53; delete "are"
insert --may be--

Column 23, line 46; After "calculating" insert --at least three discrete values, and said means for cyclically--

Column 28, line 42; delete "containe"
insert --contains--

Signed and Sealed this

Fourth Day of January, 1994

Attest:

BRUCE LEHMAN

Attesting Officer

Commissioner of Patents and Trademarks